United States Patent [19]

Takano

[11] Patent Number: 4,605,112

[45] Date of Patent: Aug. 12, 1986

[54] CONTROL SYSTEM FOR AN INFINITELY VARIABLE TRANSMISSION WITH AN ELECTROMAGNETIC POWDER CLUTCH

[75] Inventor: Toshio Takano, Hamuramachi, Japan

[73] Assignees: Fuji Jukogyo Kabushiki Kaisha, Tokyo, Japan; Van Doorne's Transmissie B.V., Tilburg, Netherlands

[21] Appl. No.: 538,880

[22] Filed: Oct. 4, 1983

[30] Foreign Application Priority Data

Oct. 9, 1982 [JP] Japan .................. 57-178022

[51] Int. Cl.$^4$ .................. B60K 41/02; B60K 41/28
[52] U.S. Cl. .................. 192/0.033; 192/0.076; 192/3.56; 192/21.5; 192/103 R; 474/28
[58] Field of Search .................. 192/0.033, 0.076, 3.56, 192/21.5, 103 R; 474/11, 12, 18, 28

[56] References Cited

U.S. PATENT DOCUMENTS

| | | |
|---|---|---|
| 4,109,772 | 8/1978 | Poore .................. 192/3.56 X |
| 4,152,947 | 5/1979 | Van Deursen et al. . |
| 4,466,521 | 8/1984 | Hattori et al. .................. 192/0.076 X |
| 4,488,625 | 12/1984 | Nobumoto et al. .................. 192/103 R X |

FOREIGN PATENT DOCUMENTS

| | | |
|---|---|---|
| 55-63051 | 5/1980 | Japan . |
| 55-65755 | 5/1980 | Japan . |
| 2088011 | 6/1982 | United Kingdom .................. 192/21.5 |

Primary Examiner—Allan D. Hermann
Attorney, Agent, or Firm—Martin A. Farber

[57] ABSTRACT

A control system for a belt-drive infinitely variable transmission. The transmission is connected to a crankshaft of an engine through an electromagnetic clutch. The control system is provided with an engine speed signal producing circuit, a vehicle speed producing circuit and an arithmetic circuit for controlling the clutch current flowing through the coil of the clutch in dependency on the engine speed signal and vehicle speed signal. The arithmetic circuit is so arranged as to cut off the clutch current when the engine speed decreases to a predetermined value which is slightly higher than an engine speed at which the engine stalls during shiftdown operation of the transmission.

6 Claims, 3 Drawing Figures

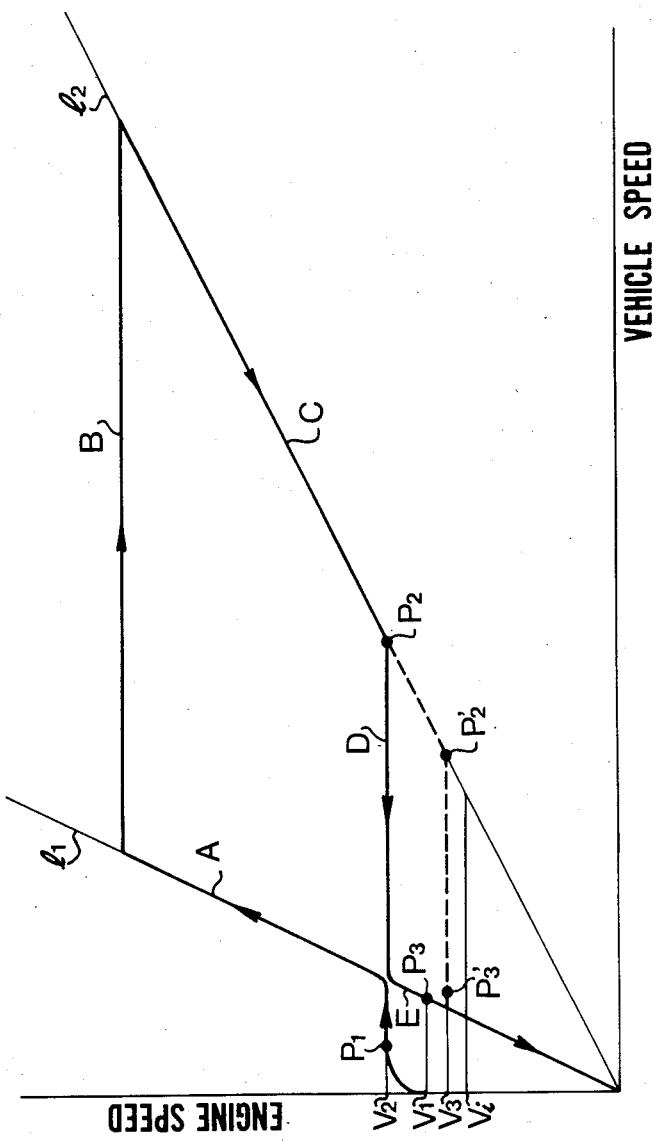

CONTROL SYSTEM FOR AN INFINITELY VARIABLE TRANSMISSION WITH AN ELECTROMAGNETIC POWDER CLUTCH

BACKGROUND OF THE INVENTION

The present invention relates to a system for controlling an automatic transmission for a vehicle having an infinitely variable belt-drive transmission associated with an electromagnetic powder clutch.

In Japanese patent laid-open specification No. 55-63051, an infinitely variable belt-drive transmission associated with a centrifugal clutch is disclosed as an automatic transmission system for a vehicle. Further, Japanese patent laid-open specification No. 55-65755 and U.S. Pat. No. 4,152,947 disclose an infinitely variable belt-drive transmission, the transmission ratio of which is automatically varied in accordance with driving conditions of the vehicle.

FIG. 3 shows relationships between vehicle speed and engine speed of a vehicle provided with such an automatic transmission. As seen from the heavy, arrowed curve in FIG. 3, the centrifugal clutch begins to engage when the engine speed reaches a speed $V_1$ which is a little higher than an idle speed $V_i$, and the clutch engages entirely at a point $P_1$ when the engine speed reaches to a predetermined speed $V_2$. Then, the vehicle is driven at a maximum transmission ratio. Therefore, engine speed and vehicle speed increase as the accelerator pedal of the vehicle is depressed. Since the transmission ratio is kept at the maximum transmission ratio of the infinitely variable transmission, the engine speed and vehicle speed increase along a straight line $1_1$ as shown by a line A. When the relationship between the depression degree of the accelerator pedal and the engine speed reaches a proper condition, the transmission ratio starts to change to decrease the ratio. Accordingly, the line A representing the engine speed and vehicle speed on the line $1_1$ changes a horizontal line B. When the transmission ratio reaches to a minimum ratio, the engine speed and vehicle speed change along a line $1_2$. Upon decelerating while the transmission ratio is minimum, both values of the engine speed and the vehicle speed descend along the line $1_2$ as shown by a line C. Further, when the engine speed decreases to a point $P_2$, that corresponds to the engine speed $V_2$ which is a small value as long as the centrifugal clutch can be kept in engagement, the transmission ratio continuously increases, whereby the vehicle speed decreases as shown by a line D (this region is hereinafter called "shiftdown"). When the vehicle speed reaches the line $1_1$ which represents the maximum transmission ratio, the engine speed also decreases along the line $1_1$ as line E. When the engine speed decreases to the speed $V_1$, the clutch is disengaged at a point $P_3$.

Thus the engine speed $P_2$ during the shiftdown excursion D is determined at a value approximate to the speed $V_2$ so as to keep the centrifugal clutch in the engaging state, which depends on the characteristics of the centrifugal clutch. If the engine speed $P_2$ is shiftdown is set to a lower value than the speed $V_2$, the clutch slips when accelerating the vehicle during the shiftdown excursion, which results in trouble, such as overheating or breakdown of the clutch.

In order to prevent such slipping of the clutch, the engine speed $P_2$ during shiftdown must be set to a higher value. Thus, fuel consumption of the engine inevitably increases. Further, the transmission ratio reaches a maximum ratio on the line $1_1$ at a considerably high engine speed and there is a drastic engine breaking effect on the vehicle, which will cause a decrease of drivability of the vehicle.

SUMMARY OF THE INVENTION

Therefore, the present invention seeks to overcome the problems occurring during the shiftdown operation of an infinitely variable belt-drive automatic transmission, and further to improve the capacity of the automatic transmission.

For this purpose, in place of the centrifugal clutch, the system of the present invention employs an electromagnetic clutch or electromagnetic powder clutch in combination with an infinitely variable belt-drive transmission so as to decrease engine speed under the clutch engaging condition during the shiftdown operation.

The present invention will be more apparent from the following description made with reference to the accompanying drawings.

BRIEF DESCRIPTION OF DRAWINGS

FIG. 3 is a graph showing relationships between engine speed and vehicle speed of a vehicle provided with a conventional transmission and a vehicle according to the present invention.

DETAILED DESCRIPTION OF THE PREFERRED EMBODIMENTS

Figure 1:
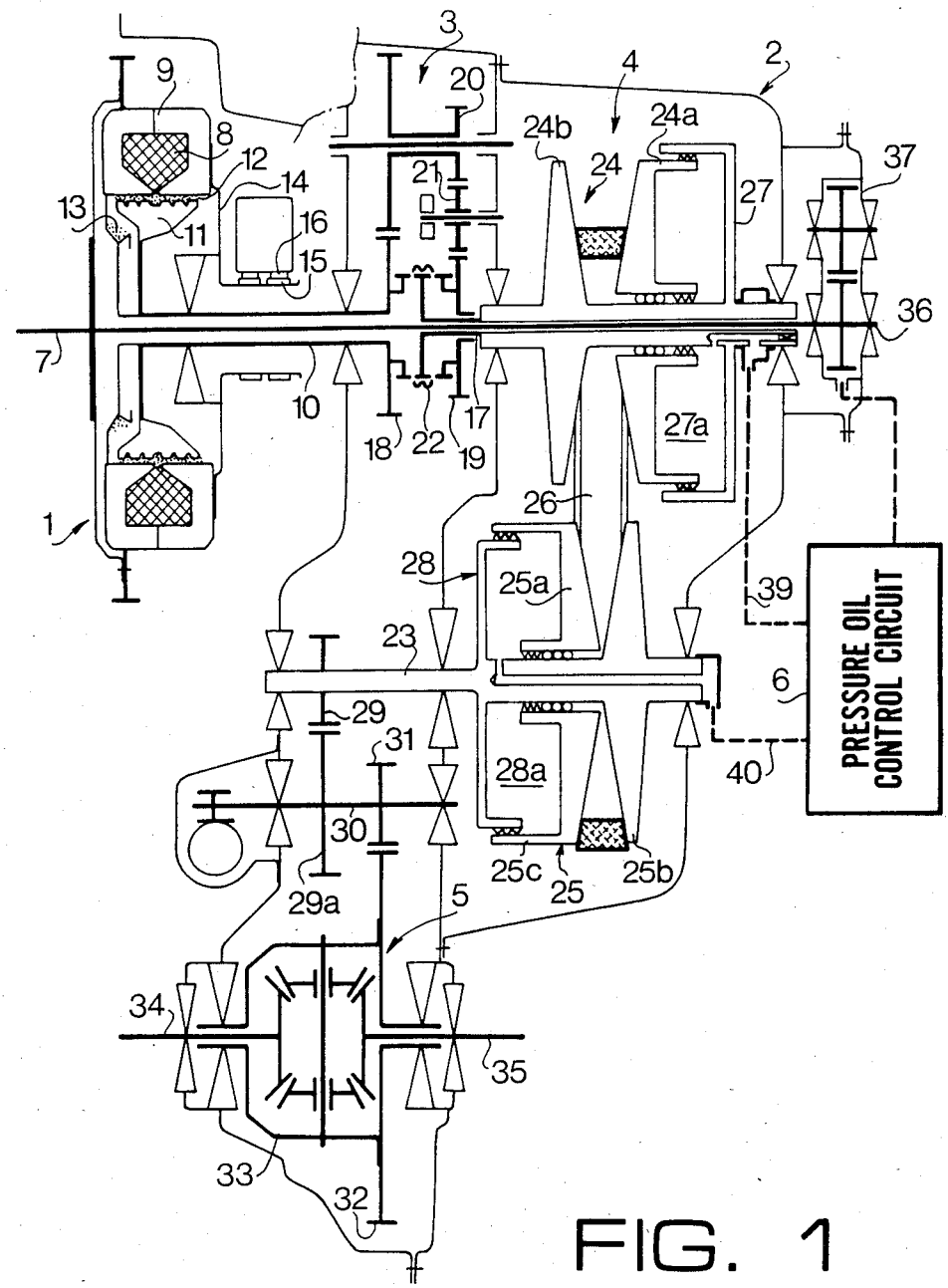
FIG. 1 is a schematic illustration showing an infinitely variable belt-drive transmission according to the present invention.

The infinitely variable belt-drive automatic transmission of the present invention comprises, as shown in FIG. 1, an electromagnetic powder clutch 1, an infinitely variable belt-drive transmission 2, including a pulley device 4, rotation changing device 3, differential 5, and pressure oil control circuit 6. A crankshaft 7 of an engine (not shown) is connected to a drive member 9 of the electromagnetic powder clutch 1. The electromagnetic powder clutch further comprises a coil 8 provided in the annular drive member 9, a driven member 11 with a gap 12 between the outer periphery thereof and the inner periphery of the drive member 9, and a powder chamber 13 defined by the drive member 9 and driven member 11. The powder chamber 13 is filled with magnetic powder. The driven member 11 is secured to an input shaft 10 of the belt-drive transmission. A holder 14 is secured to the drive member 9 and slip rings 15 electrically connected to the coil 8 are mounted on the holder 14. The coil 8 is supplied with control current from a control circuit passing through brushes 16 and slip rings 15.

Thus, when the magnetizing coil 8 is excited by the clutch current, the drive member 9 is magnetized to produce a magnetic flux passing through the driven member 11. Thus, the magnetic powder is aggregated in the gap 12 by the magnetic flux and the driven member 11 is engaged with the drive member 9 by the powder. On the other hand, when the clutch current is cut off, the drive and driven members 9 and 11 are disengaged from each other.

The rotation changing device 3 is provided between the input shaft 10 and a main shaft 17 of the infinitely variable transmission 2. The main shaft 17 is cylindrical and disposed coaxially to the input shaft 10. The rotation changing device 3 comprises a drive gear 18 integrated with the input shaft 10 and a driven gear 19 engaging rotatably with the main shaft 17 for rearward driving. The gear 18 is engaged with the gear 19 through a counter gear 20 and an idler gear 21. A dog clutch 22 is axially slidably mounted on the main shaft 17 by means of a spline engagement. By shifting the dog clutch 22 from the neutral position and engaging it with the gear 18, the main shaft 17 is coupled with the input shaft 10 to establish the forward driving condition in D range, while by shifting the clutch 22 in the opposite direction and engaging it with the gear 19, the rotation of the input shaft 10 is reversed by the gears 18 to 21 to establish rearward driving.

The main shaft 17 has an axial hole in which an oil pump drivng shaft 36 is mounted. The oil pump driving shaft 36 is connected to the crankshaft 7. A fixed conical disc 24b is formed on the main shaft 17 and a movable conical disc 24a is axially slidably mounted on the main shaft for forming a driving pulley 24. The movable conical disc 24a is also slidably mounted in a cylinder 27 secured to the main shaft 17 to form a cylinder chamber 27a as a pressure oil servo device, so that the movable conical disc 24a acts as a piston in the cylinder chamber 27a. The chamber 27a is communicated with a gear pump 37 through a passage 39 and the pressure oil control circuit 6. The gear pump 37 is adapted to be driven by the shaft 36.

An output shaft 23 is disposed in parallel with the main shaft 17. A fixed conical disc 25b is formed on the output shaft 23 corresponding to the movable conical disc 24a and a movable conical disc 25a is slidably mounted on the shaft 23. The movable conical disc 25a has a cylindrical portion 25c in which a cylinder 28 secured to the output shaft 23 is slidably engaged. A chamber 28a defined by the movable conical disc 25a and cylinder 28 is communicated with the gear pump 37 through a passage 40 and the pressure oil control circuit 6. A drive belt 26 is engaged with the driving pulley 24 and the driven pulley 25.

Secured to the output shaft 23 is a drive gear 29 which engages with a gear 29a on an intermediate shaft 30. An output gear 31 secured to the shaft 30 engages with a final reduction gear 32. Rotation of the final reduction gear 32 is transmitted to axles 34 and 35 of driving wheels (not shown) of the vehicle through a differential device 33.

Figure 2:
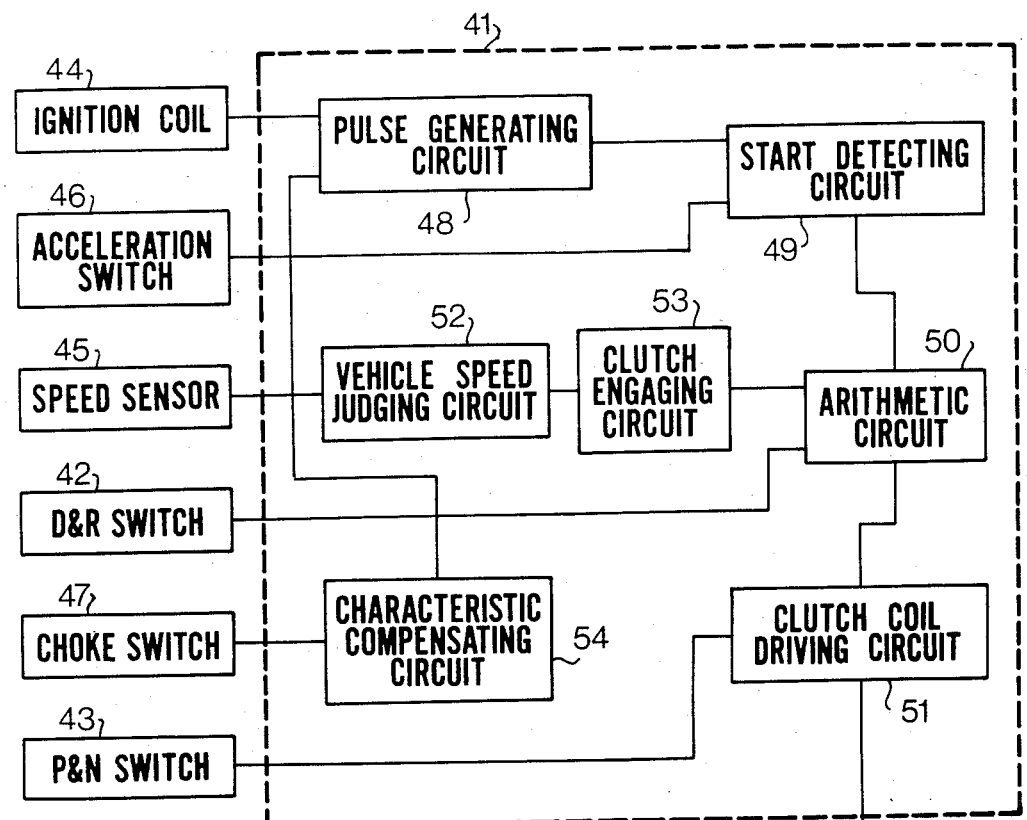
FIG. 2 is a block diagram showing a control system of the present invention.
Figure 2:
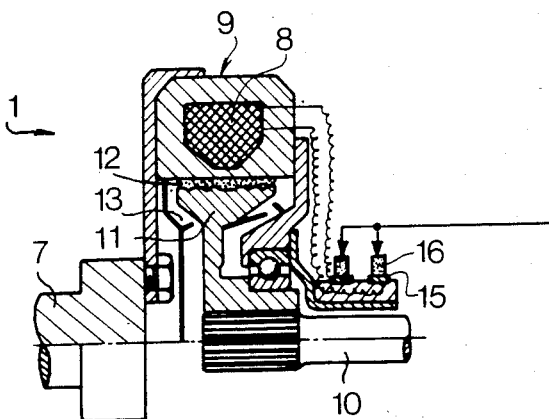

Referring to FIG. 2, an electric control circuit 41 is applied with various input signals, that is a selector lever signal indicating the position of a selector lever (not shown) from a D&R switch 42 and P&N switch 43, an ignition pulse signal from an ignition coil 44, a vehicle speed signal from a speed sensor 45; an accelerator pedal position signal indicating the depression of the accelerator pedal from an acceleration switch 46; and a choke signal indicating the operation of the choke from a choke switch 47. The D&R switch 42 is closed when the selector lever is shifted to a drive position or reverse position, and the P&N switch 43 is closed when the selector lever is shifted to a parking position or neutral position. The ignition pulse signal from the ignition coil 44 is shaped to a waveform and applied to a pulse generating circuit 48 which produces pulses in proportion to the engine speed. The output pulses from the pulse generating circuit 48 and the signal from the acceleration switch 46 are applied to a start detecting circuit 49 which detects starting operation of the vehicle. An arithmetic circuit 50 produces an output signal having a predetermined starting characteristic dependent on the signals from the circuit 49 and D&R switch 42. The output signal is fed to a clutch coil driving circuit 51 which supplies a clutch current to the coil 8. Thus, the clutch is engaged to start the vehicle. Further, the speed signal from the vehicle speed sensor 45 is applied to the arithmetic circuit 50 through a vehicle speed judging circuit 52 and a clutch engaging circuit 53, so that the arithmetic circuit 50 produces a signal for maintaining the clutch current in steady condition. Thus, the clutch is kept in engaged condition when the vehicle speed reaches a predetermined value after starting of the vehicle. This condition is kept also at a low engine speed as long as the engine does not stall. The signal from the choke switch 47 is applied to the pulse generating circuit 48 through a characteristic compensating circuit 54 which produces a signal for gradually increasing the clutch current at high idling engine speed. The signal from the P&N switch 43 is fed to the clutch coil driving circuit 51 to cut off the clutch current in the P or N range.

In operation, when the selector lever is changed to the drive position or reverse position at starting of the vehicle for shifting the clutch 22 for the infinitely variable transmission 2 and the engine speed is increased by depression of the accelerator pedal, clutch current flows dependent on the output signal of the arithmetic circuit 50, so that the electromagnetic powder clutch 1 is smoothly engaged according to the characteristic as shown by the line A in FIG. 3. During the driving along the line $l_1$, pressure oil is applied to the chamber 28a of the driven pulley 25, so that the transmission ratio is at a maximum ratio. When the vehicle driving condition reaches a predetermined condition, pressure oil is supplied to the chamber 27a of the driving pulley 24. The oil applying area of the chamber 27a is larger than that of the chamber 28a. Thus, the transmission ratio decreases progressively according to the increase of the vehicle speed (line B in FIG. 3). When the transmission ratio reaches a minimum ratio as indicated by the line $l_2$ in FIG. 3, the transmission ratio is not further decreased. When the vehicle is decelerated at the minimum transmission ratio, the engine speed decreases as well as the vehicle speed maintaining the ratio.

The electromagnetic powder clutch can be controlled independently of the engine speed unlike the centrifugal clutch of the prior art. Therefore, the electromagnetic powder clutch is kept in engagement until the engine speed decreases to a very low speed $V_3$ which is slightly higher than an engine speed at which the engine stalls. This control is performed by the arithmetic circuit 50 in dependency on signals from the ignition coil 44 and vehicle speed sensor 45. When the engine speed is lowered to the value $V_3$ at $P_2'$ as indicated by the broken line, the transmission ratio is progressively increased, and the clutch is disengaged at the point $P_3'$ after which the engine speed is reduced at the maximum transmission ratio.

When the selector lever is shifted to the parking position or neutral position, the signal from the P&N switch 43 actuates the clutch coil driving circuit 51 to cut off the clutch current to disengage the electromagnetic powder clutch 1. Accordingly, the clutch 1 is kept disengaged even under a high revolution condition such as choke operation. When the selector lever is shifted to the drive position, the characteristic compensating circuit 54 operates dependent on the signal from the choke switch 47 so as to smoothly engage the clutch 1 at starting of vehicle.

As apparent from the above explanation, the electromagnetic powder clutch 1 in combination with the infinitely variable belt-drive transmission 2 is completely disengaged in P or N range by controlling the clutch current, so that the various inconveniences caused during high idling engine speed operation in case of using the centrifugal clutch are eliminated. Further, because disengagement of the electromagnetic powder clutch 1 is not dependent only on the engine speed, but can be controlled by the clutch current, the shiftdown starting point $P_2'$ can be decreased as low as possible. Although the point $P_3'$ is illustrated adjacent to the line $l_1$ in FIG. 3, the driving shock caused by the heavy deceleration may be eliminated by positioning the point $P_3'$ near the line $l_2$. Consequently, there are many advantages, such as large driving range at a low transmission ratio, improved fuel consumption, and low noise.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling an infinitely variable transmission for a vehicle which comprises a driving pulley, a driven pulley and a belt engaged with both pulleys, the transmission ratio thereof being automatically varied by changing effective diameters of both pulleys with said belt, comprising
    an electromagnetic clutch for coupling a crankshaft of an engine with an input shaft of the transmission;
    said electromagnetic clutch having a coil for engaging the clutch by current flowing through said coil partially and completely, respectively;
    first circuit means for producing an engine speed signal;
    second circuit means for producing a vehicle speed signal dependent on vehicle speed;
    arithmetic circuit means for controlling the clutch current flowing through said coil in dependency on said engine speed signal and said vehicle speed signal;
    said arithmetic circuit means is for cutting off the clutch current so as to disengage the clutch at a low vehicle speed when the engine speed has decreased to a predetermined value which is slightly higher than an engine speed at which the engine stalls at the low vehicle speed.

2. The system for controlling an infinitely variable transmission for a vehicle according to claim 1, wherein said electromagnetic clutch is an electromagnetic powder clutch.

3. The system for controlling an infinitely variable transmission for a vehicle according to claim 1 further comprising a D&R switch for producing a selector lever signal when a selector lever of the transmission is shifted to a drive position or a reverse position, said selector lever signal is applied to said arithmetic circuit means for controlling said clutch current.

4. The system for controlling an infinitely variable transmission for a vehicle according to claim 1, wherein said cutting off of the clutch current is performed during shiftdown operation of said transmission.

5. The system for controlling an infinitely variable transmission for a vehicle according to claim 1, wherein said arithmetic circuit means for engaging fully said electromagnetic clutch at an engine speed higher than said predetermined value.

6. The system according to claim 1, wherein said predetermined value and low vehicle speed are substantially at a minimum transmission ratio of the transmission during heavy deceleration.

* * * * *